United States Patent
Son

(10) Patent No.: US 6,584,323 B1
(45) Date of Patent: Jun. 24, 2003

(54) CONTROL DEVICE FOR DISPLAYING A SHORT MESSAGE IN REAL TIME IN A DIGITAL MOBILE STATION AND METHOD THEREFOR

(75) Inventor: Joo-Ho Son, Seoul (KR)

(73) Assignee: Samsung Electronics Co., Ltd, Suwon (KR)

( * ) Notice: Subject to any disclaimer, the term of this patent is extended or adjusted under 35 U.S.C. 154(b) by 293 days.

(21) Appl. No.: 09/619,568

(22) Filed: Jul. 19, 2000

(30) Foreign Application Priority Data

Jul. 28, 1999 (KR) ............................................ 99-30936

(51) Int. Cl.[7] .............................................. H04Q 7/20
(52) U.S. Cl. ....................... 455/466; 455/456; 455/412; 455/550
(58) Field of Search ................................ 455/466, 412, 455/550, 556

(56) References Cited

U.S. PATENT DOCUMENTS 6,008,739 A * 12/1999 Hynek .................... 340/825.44
6,161,020 A * 12/2000 Kim ........................... 455/466
6,175,743 B1 * 1/2001 Alperovich .................. 455/466

FOREIGN PATENT DOCUMENTS

CN          1179681 A       4/1998       ............ H04Q/7/14

* cited by examiner

Primary Examiner—William Trost
Assistant Examiner—Brandon J Miller
(74) Attorney, Agent, or Firm—Cha & Reiter

(57) ABSTRACT

A control device for displaying the received short public notice or advertisement message in real time in a digital mobile station, which is equipped with a short message service (SMS) function, comprising a volatile memory for temporarily storing the short public notice or advertisement message to be accessed in real time; a display with a message screen capable of allocating an advertisement display part of the display for displaying the short public notice message stored in the volatile memory, upon receiving the short public notice message; a detector for detecting a predefined identifier attached to the short public notice message to identify the short public notice message from other ordinary messages; and, a control unit for controlling the short public notice message to be stored into the volatile memory and to be displayed in real time on the advertisement display part of the display.

11 Claims, 4 Drawing Sheets

(A)
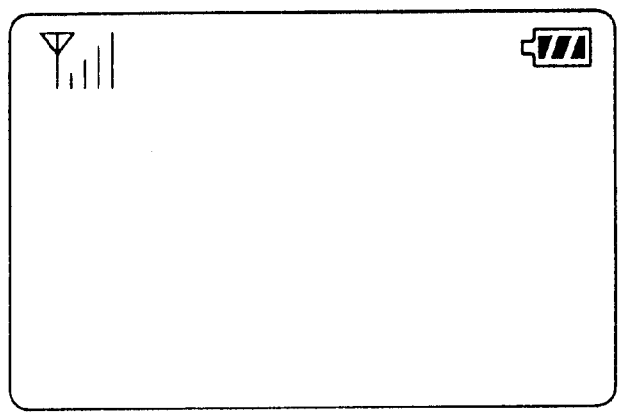
(B)
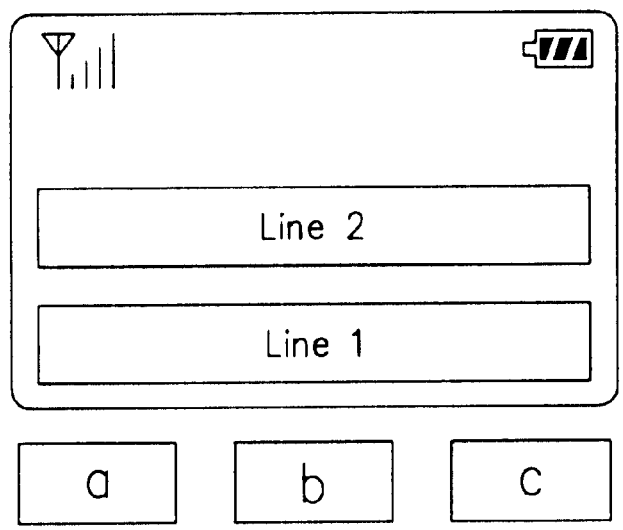
FIG. 4

CONTROL DEVICE FOR DISPLAYING A SHORT MESSAGE IN REAL TIME IN A DIGITAL MOBILE STATION AND METHOD THEREFOR

CLAIM OF PRIORITY

This application makes reference to and claims all benefits accruing under 35 U.S.C. Section 119 from an application for CONTROL DEVICE FOR DISPLAYING A SHORT MESSAGE IN REAL TIME IN A DIGITAL MOBILE STATION AND METHOD THEREFOR filed earlier in the Korean Industrial Property Office on Jul. 28, 1999 and there duly assigned Serial No. 30936/1999.

BACKGROUND OF THE INVENTION

1. Field of the Invention

The present invention relates to a control device and method for displaying a short message in a digital mobile station. More particularly, a control device and method for displaying in real time the short message sent sporadically by a telecommunication service provider to a digital mobile station.

2. Description of the Related Art

A conventional digital mobile station usually provides the user with a short message service (SMS) feature through which the short character messages can be exchanged as well as the ordinary voice communication signals. The SMS function has been widely adapted to be used in the digital mobile communications system. Accordingly, a digital mobile station is equipped with a device for editing, inputting and sending the short message. In such digital mobile station, the received short message is stored into a non-volatile memory from which it can be retrieved by the user through a specially designated key function.

Although this key function feature serves to provide the user with privacy by preventing the private short message to be accessed by others, it also causes inconvenience to the user as the user has to manipulate the key operation to retrieve any message including the non-important SMS messages forwarded by the mobile communication service provider, such as public notices or advertisements. Thus, the user is inconvenienced by having to activate a specific key function to retrieve any message regardless of its content.

Moreover, as the conventional SMS function is designed for a mobile station to store all received short messages into a non-volatile memory (i.e., EEPROM or flash memory) regardless of the content of the message, the user is unable to use the memory space efficiently. Thus, an improved SMS function is needed to display in real time the short public notice or the advertisement message being sent sporadically by the service provider, without storing the received short message into the memory.

SUMMARY OF THE INVENTION

It is an object of the present invention to provide a control device and method for displaying in real time a public notice or advertisement message sent by the communication service provider to a mobile station, without first storing the message into the memory and without performing the request specially designed to retrieve the message from the memory.

According to the embodiment of the present invention, a control device for displaying the received short public notice or advertisement message in real time in a digital mobile station includes a volatile memory for temporarily storing the short public notice or advertisement message to be accessed in real time; a display unit having a message screen capable of displaying the received short public notice or advertisement message, which is temporally stored in the volatile memory, at one end of the message screen of the display unit, upon receiving the short message; a detector for detecting a predefined identifier attached to the short message to identify the short message; and, a control unit for controlling the short message to be stored into the volatile memory temporally and to be displayed on one end of the display unit in real time.

The present invention will now be described more specifically with reference to the drawings attached only by way of example.

BRIEF DESCRIPTION OF THE ATTACHED DRAWINGS

Figure 3:
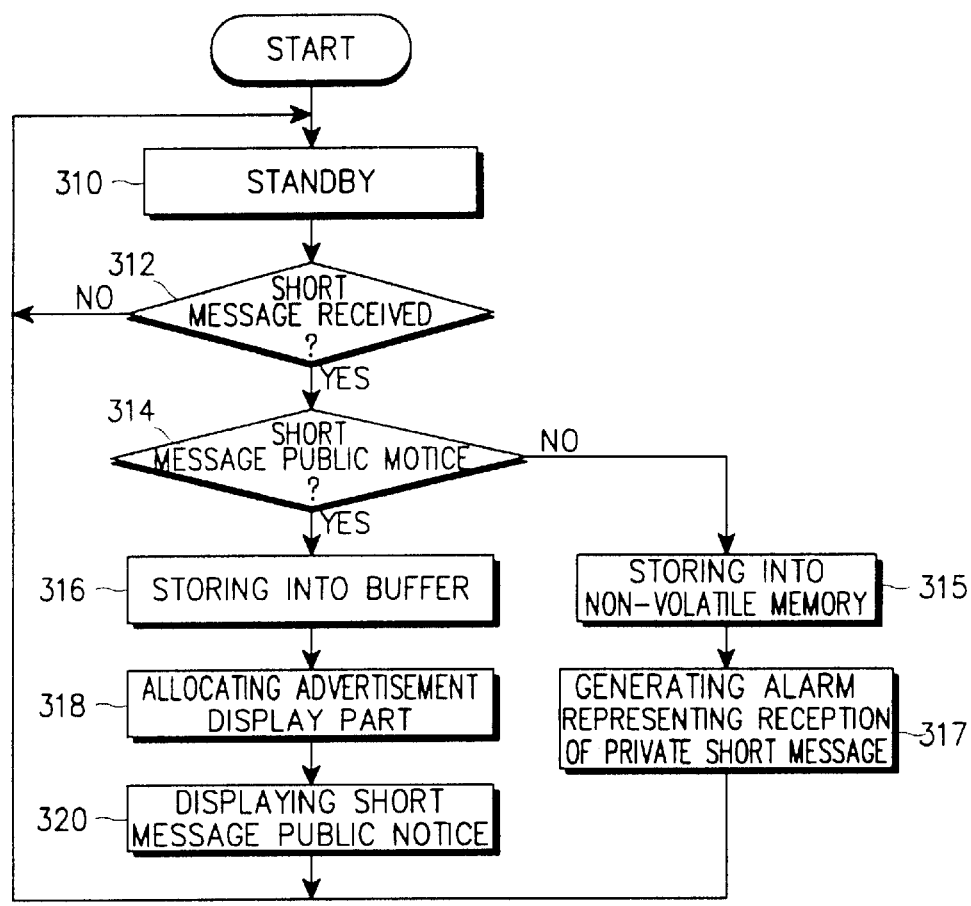

FIG. 3 is a flow chart for illustrating a method for controlling the short public notice message to be displayed in real time on the message screen portion of the display unit of a digital mobile station according to the present invention; and, FIG. 4 is a schematic plane view of the message screen of the display unit of a mobile phone when displaying the ordinary short message (Figure A) and the inventive message screen of the mobile phone according to the present invention (Figure B), displaying the short public message in real time.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
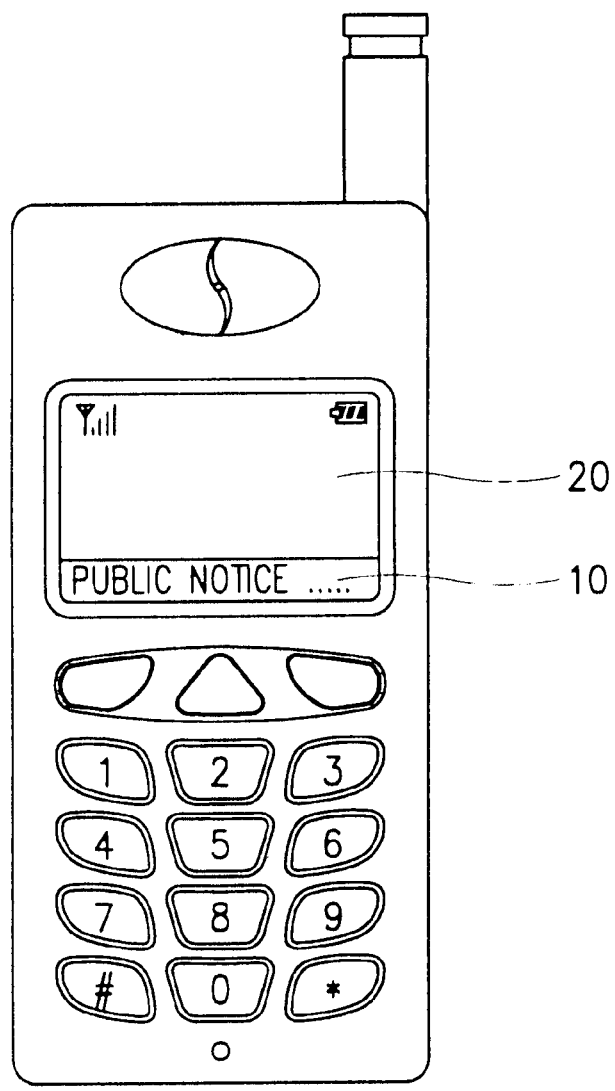
FIG. 1 is a schematic plane view of a mobile station with a message screen displaying the short public notice message in real time according to the present invention.

With reference to FIG. 1, when a communication service provider transmits a short public notice or advertisement message to the mobile phone of a subscriber, a bottom section of the message screen 20, referred to as an advertisement display section 10, is reserved to display the short public notice or advertisement message in real time according to the embodiment of the present invention.

Figure 2:
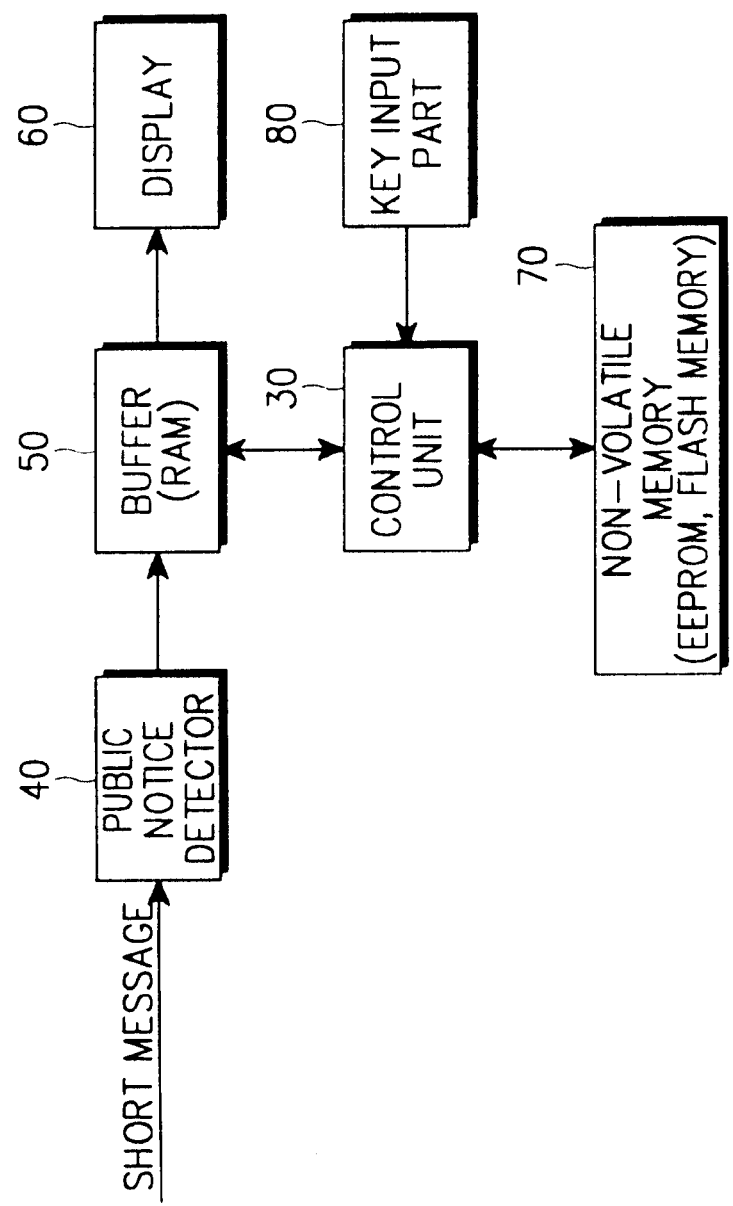
FIG. 2 is a block diagram for illustrating the structure of a mobile station provided with a control device for displaying the short public notice message in real time according to the present invention.

To this end, the mobile station is configured as illustrated in FIG. 2. It should be noted that elements not directly related to the present invention are omitted but are well known to those skilled in this art. A control unit 30 generally consisting of one-chip microprocessor controls the short public notice message to be displayed in real time and also controls other functions of the mobile phone. A key input part 80 includes a plurality of alphanumeric and functional keys operated by the user to edit, send, or receive the private short message, or manage the user's private data.

A non-volatile memory 70 such as flash memory or EEPROM serves to store the essential program for controlling the whole function of the mobile station, initial service data, SMS program, and as well as the data generated by the operation of the mobile phone. The memory 70 is also used to store the private short messages received or edited but does not store the short public notice message. The short public notice message is temporarily stored into a non-volatile memory, known as a buffer 50. However, if the public notice is desired to be stored in the non-volatile memory 70, an additional interfacing procedure is required. The buffer 50 is generally comprised of an RAM to enable the received short public notice message to be accessed and displayed in real time.

A display 60 includes a LCD, a section of which is allocated for the advertisement display section 10 under the control of the control unit 30, as shown in FIG. 1. A public notice detector 40 analyzes the received short message to distinguish a short public notice message from the ordinary private short message. The distinction is achieved by an identifier attached to the short message public notice under the control unit 40. The identifier is a distinction code that is predetermined between the communication system and the mobile phone.

The process of controlling the mobile phone to display the short public notice message in real time is described in connection with FIG. 3, wherein if the mobile phone in standby state, in step 310, detects the reception of a short message in step 312, the mobile phone determines, in step 314, whether the received short message is a public notice message. To this end, the public notice detector 40 detects the predefined identifier to identify the public notice message. If the detected identifier is not a public notice, the received short message is considered as an ordinary private short message and stored into the non-volatile memory 70 in step 315 as in the conventional SMS. Then, a signal, such as alarm, vibration, etc., is generated to notify the user of the reception of the private short message in step 317.

However, if the received short message is determined to be short public notice message in step 314 through the identifier attached to the short message, the received short public notice message is stored into the buffer 50 in step 316, then allocates the advertisement display section 10 at one end of the message screen in step 318. Then, the short public notice message stored in the buffer 50 is displayed on the advertisement display section 10 in step 320. Thus, the short public notice message is directly transferred from the buffer 50 and displayed on the advertisement display section 10 of the message screen in real time, instead of being stored into the non-volatile memory 70 as in the prior art SMS system.

With reference to FIG. 4, the figure (A) represents the state of displaying the ordinary private short message on the message screen by operating the short message retrieving keys "a", "b", and "c". The figure (B) represents the allocation of the advertisement display section in the form of "Line 1" and "Line 2" without operating the keys "a", "b", and "c" upon receiving the short public notice message. Namely, the received public notice message is displayed in real time on the advertisement display section represented by "Line 1" and "Line 2".

Thus, in addition to the feature available in the conventional SMS system, the present invention provides a means for displaying the public notice message on a portion of the message screen of the mobile phone without activating any additional key operation by the subscriber, so that the communication service provider may sporadically send the public notice or advertisement message to the subscriber.

The previous description of the preferred embodiments is provided to enable any person skilled in the art to make or use the present invention. The various modifications to these embodiments will be readily apparent to those skilled in the art, as well as are other embodiments without the use of the inventive faculty. Thus, the present invention is not intended to be limited to the embodiments shown herein but is to be accorded the widest scope consistent with the principles and novel features disclosed herein.

What is claimed is:

1. A control device for displaying a received short public notice or advertisement message in real time in a digital mobile station, which is equipped with a short message service (SMS) function, comprising:

a first memory means for temporarily storing said short public notice or advertisement message to be accessed in real time;

a second memory means for storing a private message;

a display means having a message screen section for displaying said short message stored in said first memory means upon receiving said short message;

a detecting means for detecting whether said short message is said public notice or said private advertisement message; and, a control means for controlling the display of said public notice in real time on said message screen section and for controlling said private message to be stored into said second memory means for a subsequent retrieval.

2. The control device as defined in claim 1, wherein said first memory means consists of a random access memory (RAM).

3. The control device as defined in claim 1, wherein said predefined identifier attached to said short message is a predetermined identification code between said mobile station and a communication vendor.

4. The control device as defined in claim 1, wherein said message screen section corresponds to one end of said display means.

5. The control device as defined in claim 4, wherein said message screen section includes a plurality of line sections predefined at one end of said display means.

6. The control device as defined in claim 1, wherein, if said predefined identifier is not detected, said control means controls said short message to be stored in said second memory means and generates an alarm signal to notify the user the receipt of said short message in said second memory means.

7. A method for displaying a received short public notice or advertisement message in real time in a digital mobile station, which is equipped with a short message service (SMS) function, comprising the steps of:

detecting a predefined identifier attached to an incoming short message to determine whether said incoming short message corresponds to said a private message or short message;

if said private message is detected, storing said private message in a memory for a subsequent retrieval;

if said short message is detected, allocating a predetermined region of the message screen of a display unit for displaying said short message; and, displaying said short message in real time on the message screen of said display unit.

8. The method as defined in claim 7, wherein said predefined identifier attached to said short message is a predetermined identification code between said mobile station and a communication vendor.

9. The method as defined in claim 7, wherein said message screen section includes a plurality of line sections predefined at one end of said display.

10. The method as defined in claim 7, wherein said short message is temporally stored into a volatile memory to be displayed in real time on the message screen of said display unit.

11. The method as defined in claim 7, wherein, if said predefined identifier is not detected, generating an alarm signal to notify the user the receipt of said short message in a memory.

* * * * *